(12) United States Patent
Tokunaga et al.

(10) Patent No.: US 8,430,226 B2
(45) Date of Patent: Apr. 30, 2013

(54) WORK TRANSFER APPARATUS

(75) Inventors: Naoyuki Tokunaga, Tokyo (JP); Yoshiaki Araki, Tokyo (JP); Hitoshi Tsugawa, Tokyo (JP)

(73) Assignee: Hirata Corporation, Tokyo (JP)

( * ) Notice: Subject to any disclaimer, the term of this patent is extended or adjusted under 35 U.S.C. 154(b) by 295 days.

(21) Appl. No.: 12/920,675

(22) PCT Filed: Mar. 5, 2008

(86) PCT No.: PCT/JP2008/053921
§ 371 (c)(1),
(2), (4) Date: Oct. 18, 2010

(87) PCT Pub. No.: WO2009/110072
PCT Pub. Date: Sep. 11, 2009

(65) Prior Publication Data
US 2011/0024264 A1  Feb. 3, 2011

(51) Int. Cl.
*B65G 47/90* (2006.01)
(52) U.S. Cl.
USPC .............. 198/346.2; 198/468.6; 198/470.1; 198/474.1; 198/478.1
(58) Field of Classification Search .............. 198/346.2, 198/470.1, 468.6, 474.1, 476.1, 478.1; 414/222.01, 414/225.01, 226.01, 226.05, 744.1, 744.3
See application file for complete search history.

(56) References Cited

U.S. PATENT DOCUMENTS

| | | | |
|---|---|---|---|
| 6,155,773 A * | 12/2000 | Ebbing et al. | 414/744.5 |
| 7,233,842 B2 * | 6/2007 | Bacchi et al. | 700/245 |
| 7,316,534 B2 * | 1/2008 | Hohmann et al. | 411/340 |
| 8,220,354 B2 * | 7/2012 | Todorov | 74/490.05 |
| 2004/0238324 A1 | 12/2004 | Fujimura et al. | |
| 2008/0267747 A1 * | 10/2008 | DiBella et al. | 414/225.01 |
| 2011/0135833 A1 * | 6/2011 | Schmitz et al. | 427/401 |
| 2012/0189408 A1 * | 7/2012 | Bonora | 414/222.01 |

FOREIGN PATENT DOCUMENTS

| | | |
|---|---|---|
| JP | 10-4132 | 1/1998 |
| JP | 2002-127064 | 5/2002 |
| JP | 2003-203965 | 7/2003 |
| JP | 2004-18054 | 1/2004 |
| JP | 2004-188543 | 7/2004 |
| JP | 2004-281475 | 10/2004 |
| JP | 2006-347717 | 12/2006 |

OTHER PUBLICATIONS

International Search Report issued May 13, 2008 in International (PCT) Application No. PCT/JP2008/053921.

* cited by examiner

*Primary Examiner* — Leslie A Nicholson, III
(74) *Attorney, Agent, or Firm* — Wenderoth, Lind & Ponack, L.L.P.

(57) ABSTRACT

A work transfer apparatus includes a holding unit (100) that rotates together with a rotation table (20) as a transferring mechanism intermittently driven to be fed, a lifting and lowering unit (200) for lowering the holding unit in order to transfer a workpiece held by the holding unit onto a processing table (30) as well as lifting the holding unit in order to transfer the workpiece held on the processing table onto the holding unit, and a fixing unit (300) that fixes the workpiece held on the holding unit and releases the workpiece when transferring the workpiece onto the processing table.

9 Claims, 10 Drawing Sheets

WORK TRANSFER APPARATUS

BACKGROUND OF THE INVENTION

1. Technical Field

The present invention relates to a work transfer apparatus that moves up and down and transfers a workpiece such as a mechanical component or an electronic component, and more particularly to a work transfer apparatus that can transfer a workpiece that is carried step by step by a transferring mechanism such as a rotation table onto a processing table arranged in a predetermined processing area.

2. Description of the Related Art

As a conventional work transfer apparatus, there is known an apparatus which includes: a rotation table that has a plurality of concave portions for accommodating workpieces (chip components) in a peripheral region and is driven to rotate in a predetermined angle steps; a carrier tape that is arranged to be adjacent to the rotation table; an actuator that is arranged like a cantilever above the carrier tape and the rotation table and moves a vacuum head in a vertical direction; and which has a configuration that the vacuum head is utilized to adsorb each workpiece while moving the vacuum head by the actuator, thereby transferring the workpiece onto the carrier tape from the rotation table (se, e.g., Unexamined Japanese Patent Publication No. 2004-18054).

Further, as another work transfer apparatus, there is known an apparatus which includes: a rotation table that has a plurality of vacuum holders for adsorbing and holding workpieces (chips) in a peripheral region and is driven to be rotated in a predetermined angle steps; a chip pedestal arranged to face the vacuum holders in a state where the rotation table is stopped at a predetermined angle position; a lifting and lowering device that drives the chip pedestal to move up and down; and which has a configuration that each workpiece on the chip pedestal is adsorbed and held by the vacuum holder by driving the chip pedestal to move up and down by the lifting and lowering device and appropriately driving the rotation table to rotate, thereby transferring the workpiece to a predetermined area (see, e.g., Unexamined Japanese Patent Publication No. 10-4132).

However, in these apparatuses, since the workpiece is transferred while being adsorbed and lifted, no problem occurs when the workpiece is a small and lightweight piece like an electronic component (a chip), but adsorbing and holding the workpiece at a predetermined position is difficult when transferring the workpiece that is a large and heavy workpiece like a mechanical component.

On the other hand, as a conventional index type production apparatus, there is known an apparatus which includes: a plurality of rotation tables (index tables) that are capable of supporting workpieces and are driven to rotate in a predetermined angle steps; a work unit that is arranged to be adjacent to each of the plurality of rotation tables to perform a predetermined work; a plurality of rotating arms each of which is arranged between adjoining rotation tables and has a chuck that grasps a workpiece; and which has a configuration that a workpiece subjected to a predetermined work is grasped to be sequentially transferred from the rotation table to another rotation table (see, e.g., Unexamined Japanese Patent Publication No. 2006-347717).

However, in this apparatus, since each work is carried out on the rotation table by the work unit, when performing a work that applies a load (e.g., pressurization or press fitting), each rotation table must be sturdily formed to bear the load. Further, since a workpiece transfer operation is carried out by each rotating arm that requires an operation of lifting/lowering, rotation and lifting/lowering in the mentioned order, this operation cannot be smoothly performed, and each rotating arm must be sturdily formed when the workpiece is a heavy piece, thus leading to an increase in size or in cost of the apparatus.

SUMMARY OF THE INVENTION

1. Problem to be Solved by the Invention

In view of the above-described conventional technology, an object of the present invention relates to a work transfer apparatus that moves up and down and transfers a workpiece such as a mechanical component or an electronic component while achieving simplification of a construction, miniaturization of the apparatus, realization of a low cost, reduction in time required for transferring, and more particularly the object is to provide a work transfer apparatus that can transfer a workpiece carried in a predetermined angle steps by a rotation table onto a processing table arranged in a predetermined processing area and transfer the processed workpiece to the rotation table side from the processing table.

2. Means for Solving the Problem

A work transfer apparatus according to the present invention that achieves the object is a work transfer apparatus capable of transferring a workpiece intermittently carried in a predetermined carrying direction by a transferring mechanism onto a processing table arranged along the carrying direction, includes: a holding unit that is attached to the transferring mechanism and configured to hold the workpiece; a lifting and lowering unit that lowers the holding unit to transfer the workpiece held by the holding unit onto the processing table and lifts the holding unit to transfer the workpiece held on the processing table onto the holding unit; and a fixing unit that is configured to fix the workpiece held by the holding unit and release the fixation of the workpiece when transferring the workpiece onto the processing table.

According to this configuration, in a state that the workpiece is held by the holding unit, the workpiece is fixed by the fixing unit and fixed (held so as not to move) at a predetermined holding position on the holding unit. Further, when the transferring mechanism intermittently performs a transferring operation and stops at a predetermined position, the lifting and lowering unit drives the holding unit to move down, the workpiece is released from the fixed state by the fixing unit to be transferred onto the processing table, then the holding unit is driven to move up upon termination of the processing, the workpiece is lifted up from the processing table to be held on the holding unit and fixed (held so as not to move) at a predetermined holding position by the fixing unit.

As described above, the workpiece can be transferred from the holding unit onto the processing table and the processed workpiece can be lifted up from the processing table to be transferred onto the holding unit by the lifting and lowering operations of the holding unit and the fixing and releasing operations of the fixing unit alone, thereby achieving simplification of the construction, miniaturization of the apparatus, reduction in time required for transferring. Furthermore, since predetermined processing can be applied to the workpiece on the processing table provided separately from the transferring mechanism, the transferring mechanism can be simplified as compared with an example where the processing is performed on the transferring mechanism.

In the above-described configuration, it is possible to adopt a configuration that the transferring mechanism includes a rotation table that is driven to intermittently rotate, the processing table is arranged around the rotation table, the holding unit consists of a plurality of holding units arranged in a circumferential direction of the rotation table, and the lifting and lowering unit and the fixing unit are provided in accordance with each of the plurality of holding units.

According to this configuration, with the plurality of processing tables being arranged around the rotation table, when the rotation table is driven to rotate in a predetermined angle steps, the holding unit is driven to move up and down and the workpiece fixing operation and releasing operation are performed by the fixing unit, a plurality of types of processing can be performed with respect to a plurality of workpieces.

In the above-described configuration, it is possible to adopt a configuration that the transferring mechanism includes a conveyer unit that is driven to be intermittently fed along a predetermined track, the processing table is arranged along one side portion of the conveyer unit, the holding unit consists of a plurality of holding units arranged along the one side portion of the conveyer unit, and the lifting and lowering unit and the fixing unit are provided in accordance with each of the plurality of holding units.

According to this configuration, in the state that the plurality of processing tables are arranged along the conveyer unit, the conveyer unit is driven to be fed for a predetermined feed distance, the holding unit is driven to move up and down, and the workpiece fixing operation and releasing operation are performed by using the fixing unit, thereby applying the plurality of types of processing with respect to a plurality of workpieces.

In the above-described configuration, it is possible to adopt a configuration that the holding unit includes: a lifting and lowering frame that is supported to allow its upward and downward movements with respect to the transferring mechanism; and a holding frame that is formed to have a holding portion configured to hold the workpiece and an opening portion allowing the processing table to pass therethrough.

According to this configuration, the workpiece can be delivered or received between the processing table arranged to be adjacent to the transferring mechanism and the holding unit, the workpiece held in the holding portion of the holding frame comes into contact with an upper surface of the processing table when the lifting and lowering frame moves down with respect to the transferring mechanism, and the processing table lifts up the workpiece through the opening portion of the holding frame so as to move away from the holding portion when the lifting and lowering frame moves down, thereby completing transfer onto the processing table. Since the workpiece can be transferred by the relative movement of the holding frame and the processing table alone as described above, the construction can be further simplified, and the time required for transfer can be further reduced.

In the above-described configuration, it is possible to adopt a configuration that the holding frame is detachably formed with respect to the lifting and lowering frame.

According to this configuration, various kinds of workpieces can be handled by replacing the holding frames associated with types of workpieces (workpieces having different sizes, outlines, etc.), and replacing the holding frames alone can suffice without replacing the lifting and lowering frame, whereby a replacement operation can be easily carried out.

In the above-described configuration, it is possible to adopt a configuration that the lifting and lowering unit includes: a guide rail that is fixed to the transferring mechanism and guides the lifting and lowering frame to allow upward and downward movements; and a driving mechanism that is arranged in the transferring mechanism to exercise driving force for lifting and lowering the lifting and lowering frame.

According to this configuration, when (the lifting and lowering frame of) the holding unit is guided to allow its upward or downward movement along the guide rail, since the driving mechanism that exercises driving force is arranged in the transferring mechanism, obstacles to the lifting and lowering operations of the holding unit (the lifting and lowering frame and the holding frame) can be eliminated from the lifting and lowering region, whereby interference with the driving mechanism and the like can be assuredly avoided to guarantee the smooth lifting and lowering operations.

In the above-described configuration, it is possible to adopt a configuration that the fixing unit includes: an abutting member that is movably supported to enable abutment on and separation from the workpiece; and an interlocking mechanism that presses the abutting member against the workpiece in interlock with upward movement of the holding unit and releases the pressing of the abutting member in interlock with downward movement of the holding unit.

According to this configuration, since pressing of the workpiece by the abutting member and release of this pressing are performed by the interlocking mechanism that interlocks with the lifting and lowering operation of the holding unit, the simplification of the construction can be achieved without adopting special detecting means, and the timings for the pressing of the workpiece and the release can be highly accurately set at a predetermined timing.

In the above-described configuration, it is possible to adopt a configuration that the interlocking mechanism includes: an urging member that urges the abutting member in a direction along which the abutting member is separated from the workpiece; a pressing member that is supported to be movable in a pressing direction along which the abutting member is pressed against the workpiece and a releasing direction along which the pressing is released; and a cam member that is fixed to the transferring mechanism and exercises a cam function of moving the pressing member in the pressing direction in interlock with the upward movement of the holding unit and moving the pressing member in the releasing direction in interlock with the downward movement of the holding unit.

According to this configuration, when the cam member exercises the cam function on the pressing member by the lifting and lowering operations of the holding unit, the pressing member can press the abutting member to fix the workpiece and the pressing member can release the pressing of the abutting member to release the workpiece, and the simplification of the construction can be achieved without adopting special detecting means, thereby highly accurately setting the timings for the pressing and the release of the workpiece at a predetermined timing.

In the above-described configuration, it is possible to adopt a configuration that the abutting member and the urging member are supported by the holding frame, and the pressing member is supported by the lifting and lowering frame.

According to this configuration, since the abutting member and the urging member are supported by the holding frame, the abutting member having an optimum shape associated with the workpiece can be adopted when preparing the holding frame in accordance with a type of the workpiece.

3. Advantageous Effects of the Invention

According to the work transfer apparatus having the above-described configuration, the workpiece, e.g., a mechanical component or an electronic component can be lifted or lowered to be transferred while achieving simplification of the construction, miniaturization of the apparatus, realization of a low cost, reduction in time required for transferring and, in particular, the workpiece that is intermittently transferred by the transferring means can be transferred onto the processing table arranged along the transferring direction to be subjected to predetermined processing, and then it can be again transferred onto the holding unit from the processing table to be carried to the next processing area (the processing table).

EXPLANATIONS OF LETTERS AND REFERENCE NUMERALS

Figure 1:
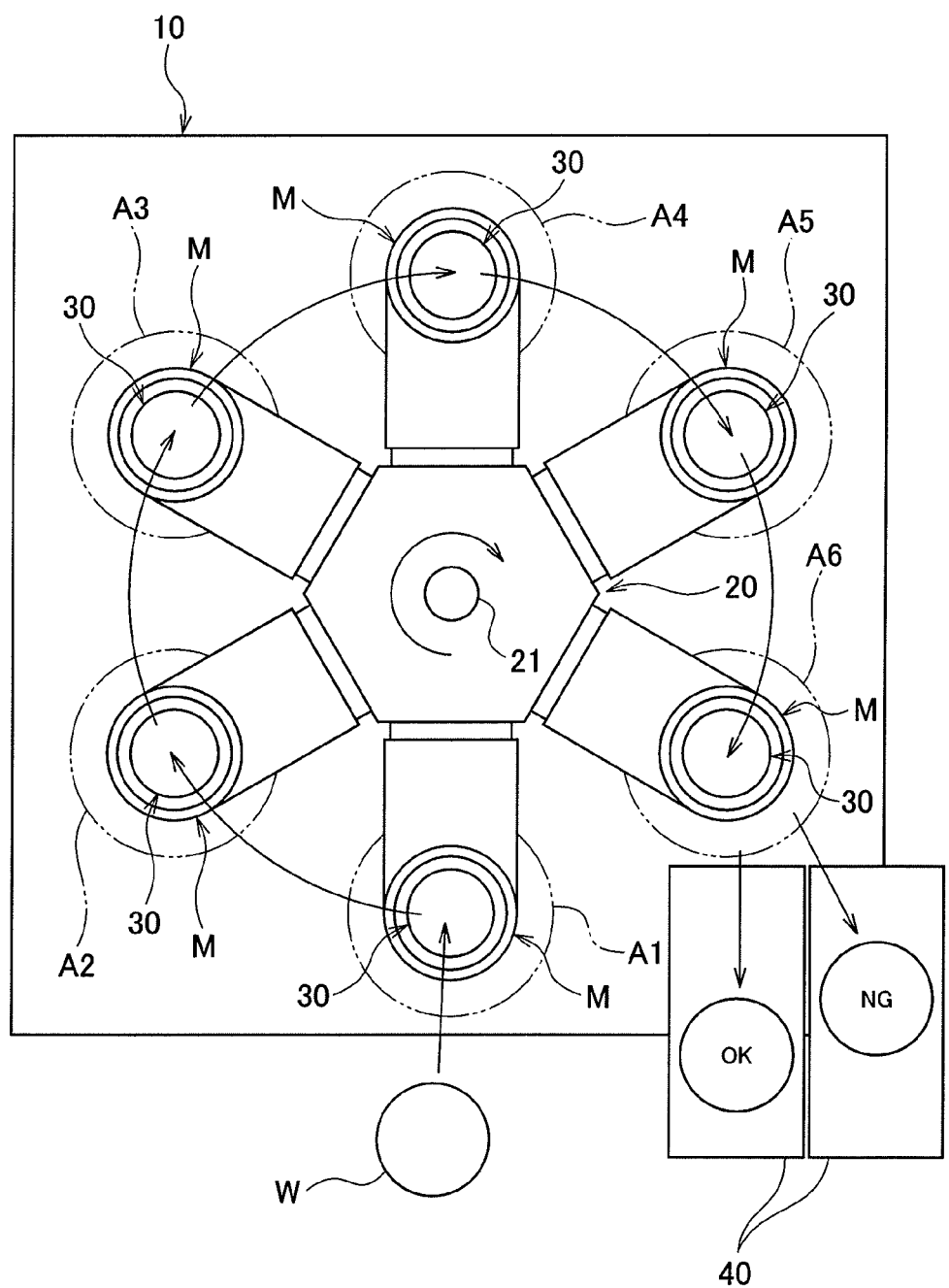
FIG. 1 is a schematic view showing an embodiment of a processing system including a work transfer apparatus according to the present invention.

W workpiece
A1, A2, A3, A4, A5, A6 processing area
10 base
20 rotation table (transferring mechanism)
21 rotary shaft
22 motor
23 upper table
24 sidewall
24a slit
30 processing table
31 mount portion
32 leg portion
33 base portion
40 carry-out line
M work transfer apparatus
100 holding unit
110 lifting and lowering frame
111 slider portion
111a guided portion
111b opening portion
112 holder portion
112a opening portion
112b slot
112c slit
112d positioning pin
112e holding portion
113 interlocking mechanism
113a rod
113b urging portion
R1, R2 ring member
S1, S2 spring
113c arm portion
120 holding frame
121 holding portion
122 opening portion
123 slit
124 slot
125 fitting hole
200 lifting and lowering unit
210 guide rail
220 ball screw (driving mechanism)
230 motor (driving mechanism)
240 nut member
300 fixing unit
310 abutting member
320 urging member (interlocking mechanism)
330 pressing member (interlocking mechanism)
331 pressing pin
332 follower pin
340 cam member (interlocking mechanism)
341 lower end portion
342 upper end portion
343 cam groove
400, 400' conveyer unit (transferring mechanism)
401, 401' track
402, 402' movable conveyer
403 hanging frame

DETAILED DESCRIPTION OF THE INVENTION

The present invention will now be described hereinafter with reference to the accompanying drawings. It is to be noted that an example where a work transfer apparatus according to the present invention is applied to a processing system including a rotation table will be explained in this embodiment.

As shown in FIG. 1, this processing system includes a substantially rectangular base 10, a rotation table 20 as a transferring mechanism that is arranged on the base 10 and has a substantially hexagonal columnar shape, six work transfer apparatuses M that are arranged in a circumferential direction of the rotation table 20 at equal intervals and provided to the rotation table 20, six processing areas A1 to A6 that are annularly arranged around the rotation table 20 so as to correspond to the six work transfer apparatuses M, six processing tables 30 arranged in the respective processing areas A1 to A6, a plurality of processing units (not shown) arranged in the respective processing areas A1 to A6, a carry-out line 40 through which a workpiece W subjected to all types of processing is carried out.

Figure 2:
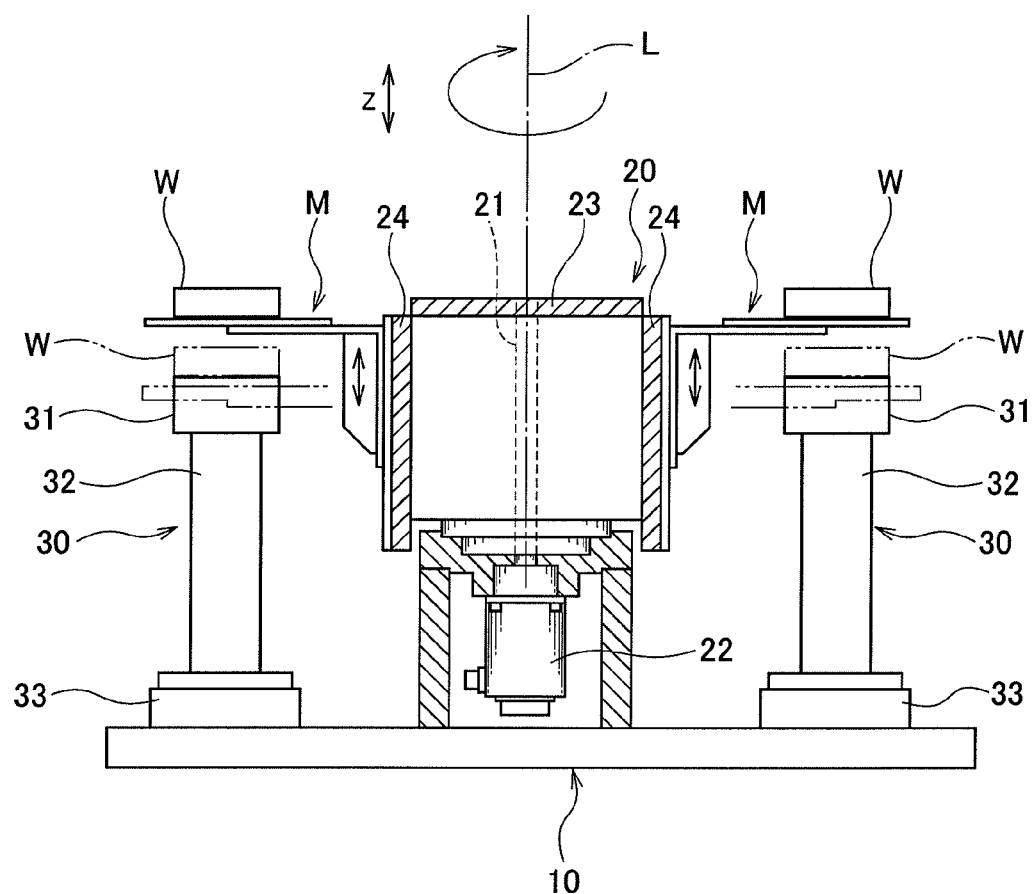
FIG. 2 is a side view showing an embodiment of the processing system including the work transfer apparatus according to the present invention.

As shown in FIG. 2, the rotation table 20 includes a rotary shaft 21 having an axis line L extending in a vertical direction Z, a motor 22 that drives the rotary shaft 21 to rotate in a predetermined angle steps, an upper table 23 and a sidewall 24 that are formed so as to integrally rotate with the rotary shaft 21. The upper table 23 and the sidewall 24 are formed so as to define an outer contour of a substantial hexagonal column as a whole.

Further, the six work transfer apparatuses M are provided on the sidewall 24 so as to be arranged in the circumferential direction of the rotation table 20 at equal intervals.

That is, the rotation table 20 integrally includes the six work transfer apparatuses M and is driven to rotate about the axis line L in a predetermined angle steps (substantially in 60-degree steps in this example).

Figure 3:
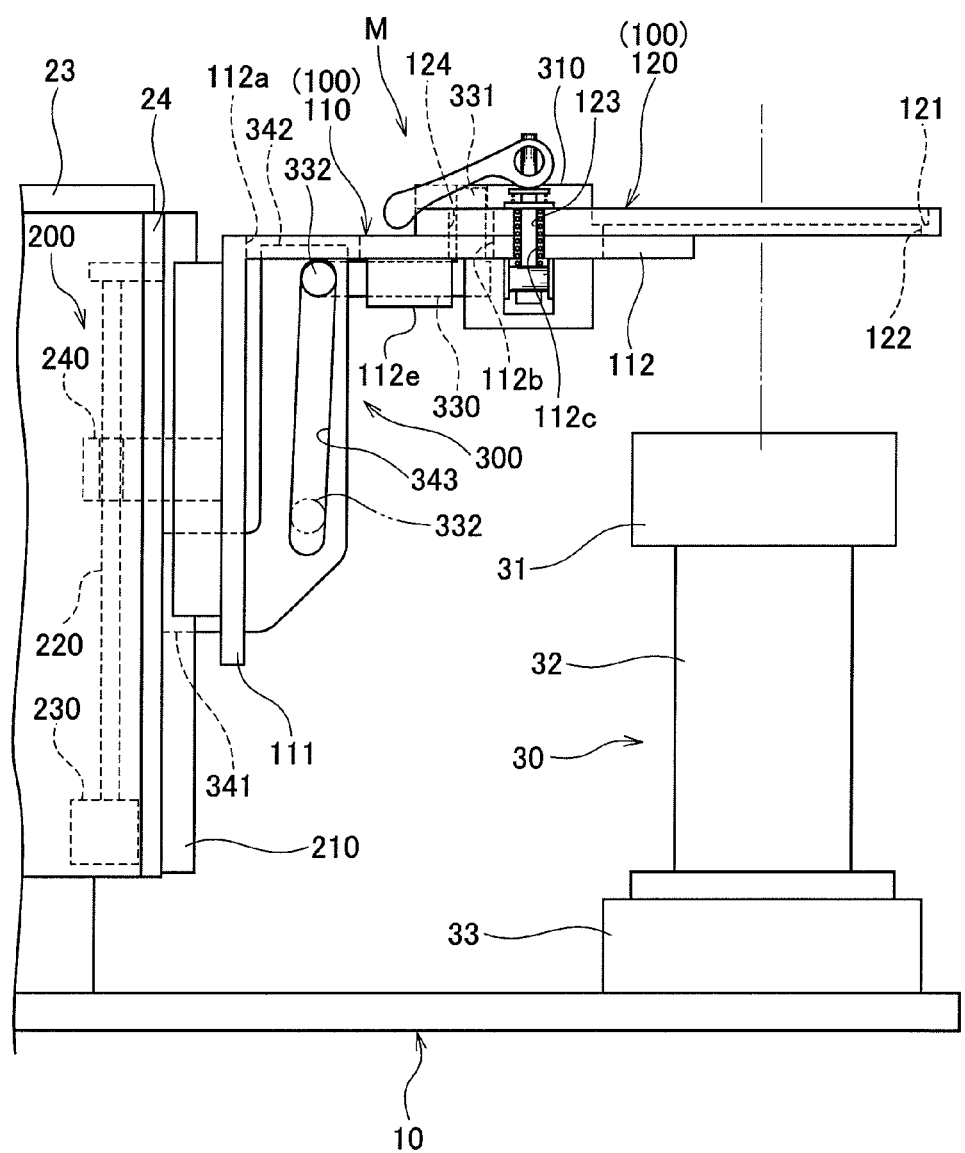
FIG. 3 is a side view showing an embodiment of the work transfer apparatus according to the present invention.

As shown in FIG. 2 and FIG. 3, the processing table 30 includes mount portions 31 each of which is formed into a columnar shape having a predetermined outside diameter and on which the workpiece W can be mounted, leg portions 32 each of which holds the mount portion 31 at a predetermined height position, base portions 33 each of which supports the leg portion 32.

The mount portion 31 is formed into a shape that can pass through an opening portion 122 of a holding frame 120 (described later). Here, although the mount portion 31 is formed to have a circular cross section, it is formed to have a rectangular cross section if an outline of the workpiece W is rectangular.

It is to be noted that the processing tables 30 may be formed so as to be movable in a horizontal direction or may be formed so as to enable rotation of the mount portions 31 as required.

Figure 4:
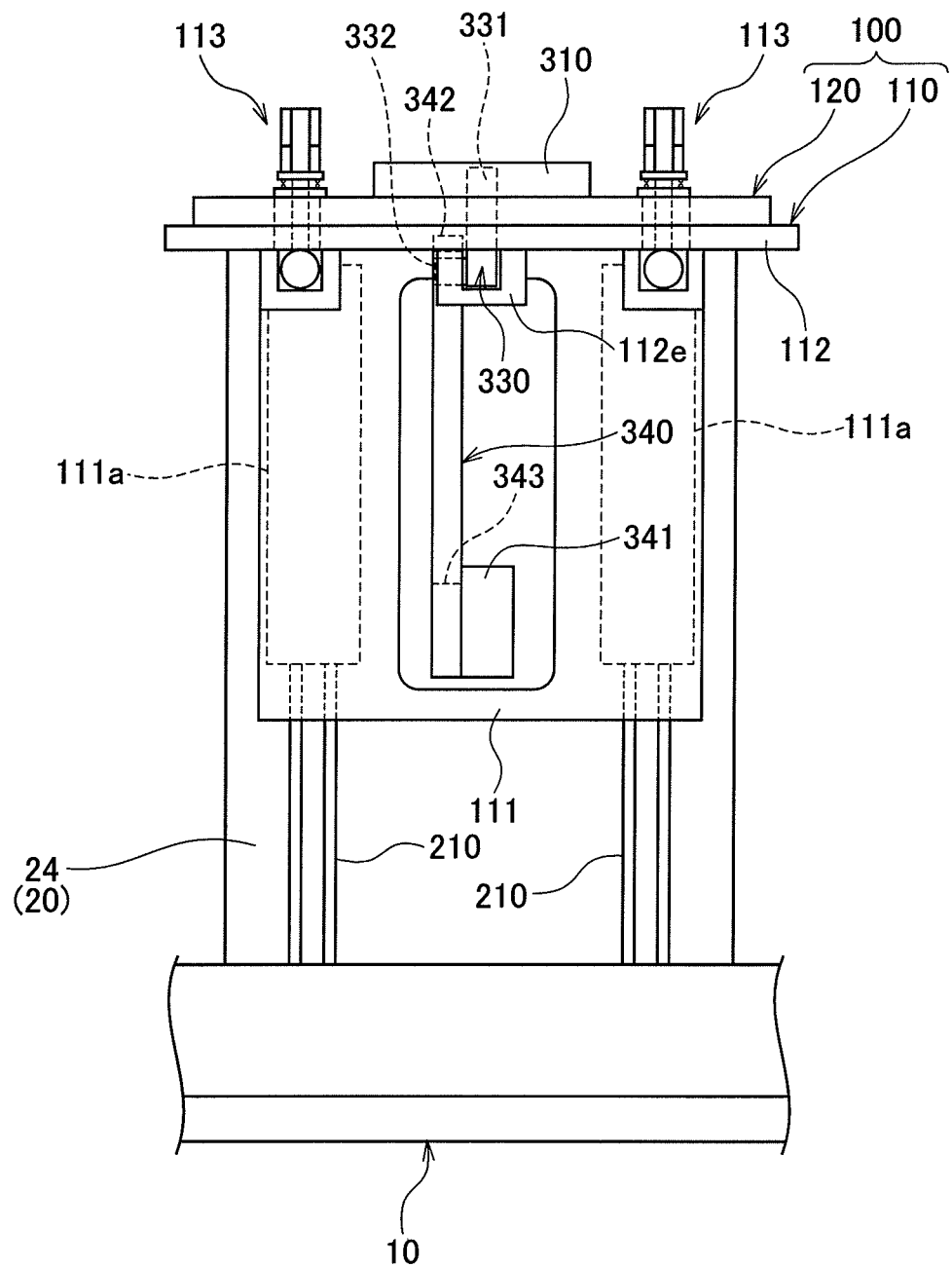
FIG. 4 is a front view showing an embodiment of the work transfer apparatus according to the present invention.
Figure 5:
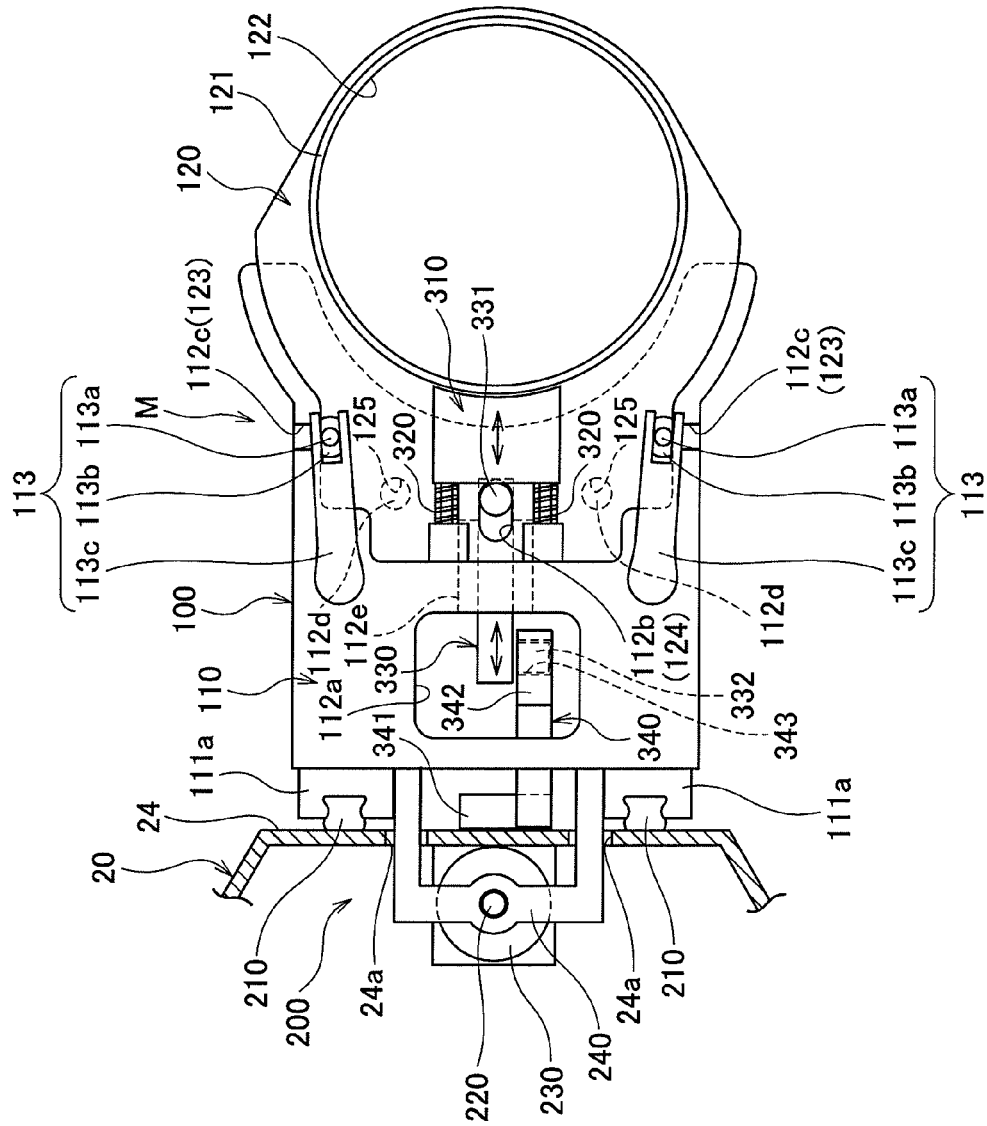
FIG. 5 is a plan view showing an embodiment of the work transfer apparatus according to the present invention.

As shown in FIG. 3 to FIG. 5, the work transfer apparatus M includes a holding unit 100 that is provided on the sidewall 24 of the rotation table 20 and is capable of holding the workpiece W, a lifting and lowering unit 200 that drives the holding unit 100 to move up and down, a fixing unit 300 that is capable of fixing the workpiece W held on the holding unit 100 and releasing this fixation when transferring the workpiece W onto (the mount portion 31 of) the processing table 30.

As shown in FIG. 3 to FIG. 6, the holding unit 100 includes a lifting and lowering frame 110 that is supported on the sidewall 24 of the rotation table 20 so as to be capable of moving up and down, a holding frame 120 detachably formed with respect to the lifting and lowering frame 110.

Figure 6:
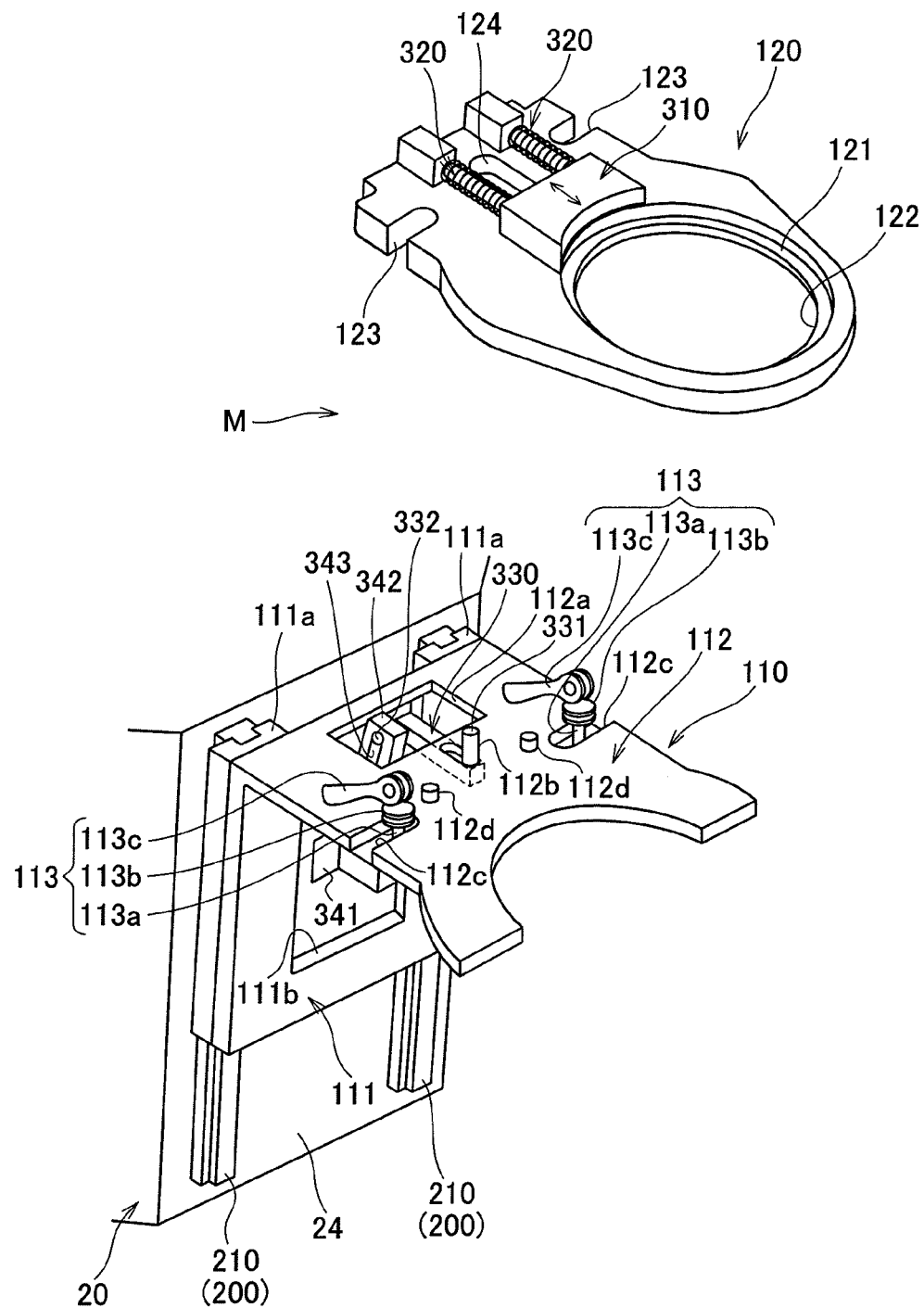
FIG. 6 is an exploded perspective view showing an embodiment of the work transfer apparatus according to the present invention.
Figure 7:
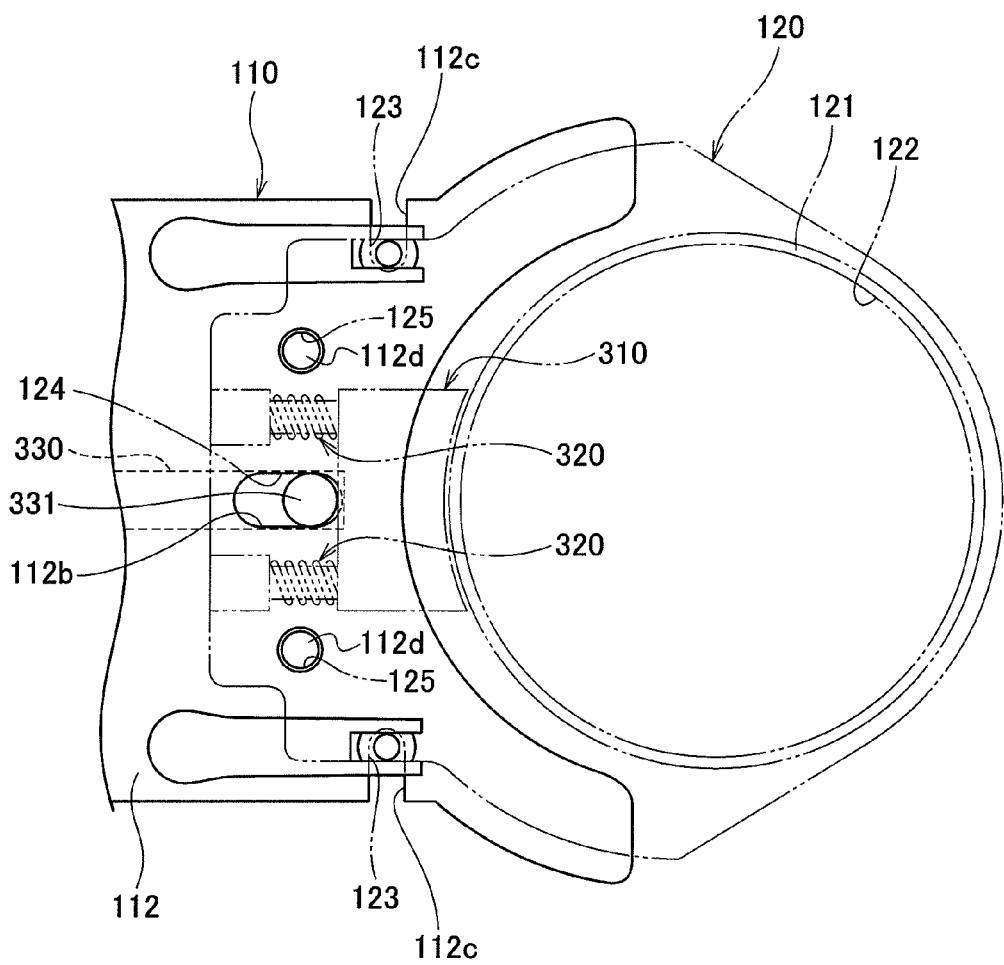
FIG. 7 is a partial plan view showing a lifting and lowering frame and a holding frame forming a part of the work transfer apparatus.

As shown in FIG. 3 and FIG. 6, the lifting and lowering frame 110 is formed so as to have a cross section bent into a substantially-L-like shape, and includes a slider portion 111 that is guided by guide rails 210 (described later), a tabular holder portion 112 that is formed to bend from an upper end of the slider portion 111 in the horizontal direction and connects and holds the holding frame 120, two connecting mechanisms 113 provided to the holder portion 112.

As shown in FIG. 3 to FIG. 6, the slider portion 111 has two guided portions 111a movably fitted on guide rails 210 (described later), a substantially rectangular opening portion 111b formed in a region sandwiched between the two guided portions 111a.

As shown in FIG. 3 to FIG. 7, the holder portion 112 has a substantially rectangular opening portion 112a through which a cam member 340 (described later) passes, a slot 112b through which a pressing pin 331 of a pressing member 330 (described later) passes, two slits 112c through which rods 113a (described later) of the connecting mechanisms 113 pass, two positioning pins 112d that position the holding frame 120, a holding portion 112e that holds a pressing member 330 (described later).

As shown in FIG. 3 to FIG. 7 and FIG. 8, the connecting mechanism 113 includes a rod 113a swingably supported so as to be capable of entering the slit 112c, an urging portion 113b movably fitted onto the rod 113a, and an arm portion 113c that is rotatably connected to an upper end of the rod 113a and has a cam portion 113c' that is capable of pressing the urging portion 113b by a cam function.

Figure 8A:
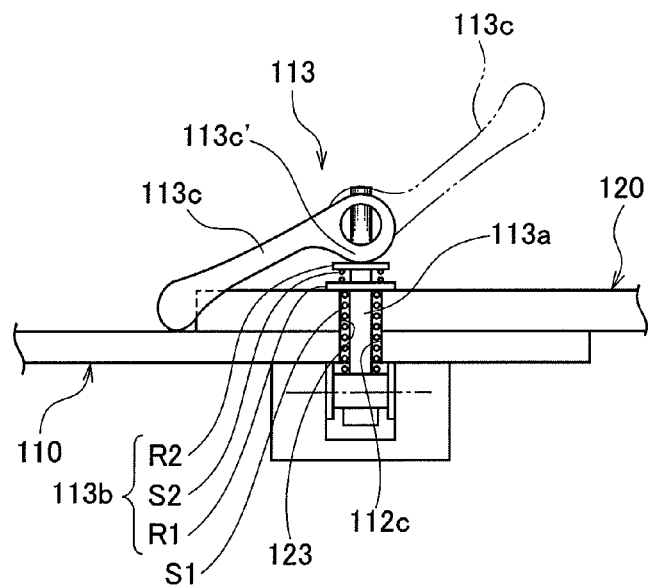
FIG. 8A is a partial side view showing the lifting and lowering frame and the holding frame forming a part of the work transfer apparatus.
Figure 8B:
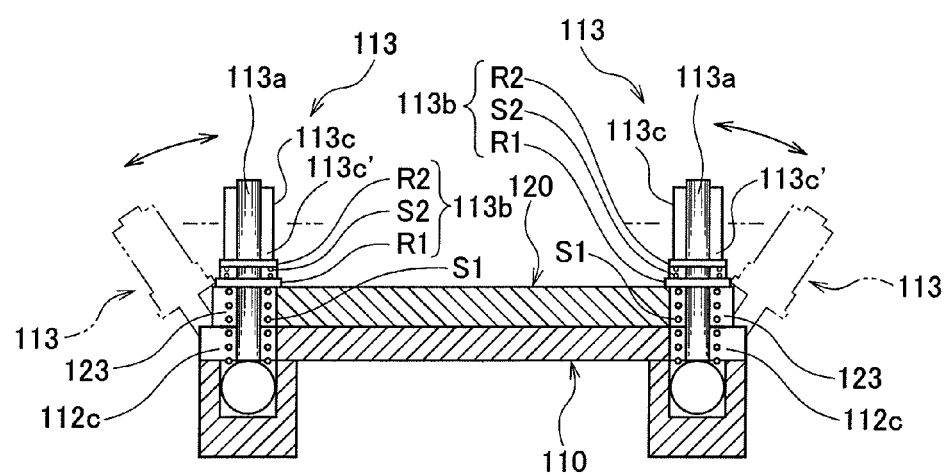
FIG. 8B is a partial cross-sectional view showing the lifting and lowering frame and the holding frame forming a part of the work transfer apparatus.

As shown in FIG. 8A and FIG. 8B, the urging portion 113b is formed of a ring member R1, a spring S2 and a ring member R2 in a spring S1 assembled to an outer periphery of the rod 113a, the ring member R1 that abuts on the holding frame 120 against urging force of the spring S1, the spring S2, and the ring member R2 that is urged by the spring S2 to abut on the cam portion 113c' of the arm portion 113c which are provided from a swing supporting point side of the rod 113a in the mentioned order.

As shown in FIG. 3 and FIG. 5 to FIG. 7, the holding frame 120 has an annular holding portion 121 that holds the workpiece W, a circular opening portion 122 that is formed on the inner side of the holding portion 121 and allows the mount portion 31 of the processing table 30 to pass therethrough, two slits 123 that allow the rods 113a to enter, a slot 124 through which the pressing pin 331 of the pressing member 330 is inserted, two fitting holes 125 in which the positioning pins 112d are fitted.

Moreover, the holding frame 120 is provided with an abutting member 310 and urging members 320 of a fixing unit 300 (described later).

Here, giving a description on a procedure of connecting the holding frame 120 to the lifting and lowering frame 110, the holding frame 120 associated with the workpiece W is prepared as shown in FIG. 6, the holding frame 120 is joined to the holder portion 112 of the lifting and lowering frame 110 so as to insert the pressing pin 331 of the pressing member 330 into the slot 124 and fit the positioning pins 112d into the fitting holes 125 in a state that the rods 113a of the connecting mechanisms 113 are set to the outside of the slits 112c as indicated by two dot-dash lines in FIG. 8B.

Then, as indicated by solid lines in FIG. 8A and FIG. 8B, the rods 113a are moved upward so as to be fitted into the slits 112c and 123, then each arm portion 113c is rotated to a predetermined angular position, and each urging portion 113b (the ring members R1 and R2) is pressed downwards by the cam function of (the cam portion 113c' of) each arm portion 113c. As a result, the holding frame 120 is connected to the lifting and lowering frame 110 to be sturdily fixed.

Since the holding frame 120 is detachably formed with respect to the lifting and lowering frame 110 in this manner, replacing the current frame to the holding frame 120 associated with a type of the workpiece W (a workpiece having a different size, contour or the like) enables handling various kinds of workpieces W, and the replacement operation can be easily carried out since replacing the holding frame 120 alone can suffice without replacing the lifting and lowering frame 110.

As shown in FIG. 3, FIG. 5 and FIG. 6, the lifting and lowering unit 200 includes two guide rails 210 that are fixed on the sidewall 24 of the rotation table 20 and extend in the vertical direction Z, a ball screw 220 that is arranged in the rotation table 20 and extends in the vertical direction Z, a motor 230 that drives the ball screw 220 to rotate, a nut member 240 to which the ball screw 220 is screwed and which is connected to the lifting and lowering frame 110 of the holding unit 100 through slits 24a (see FIG. 6) of the sidewall 24. Here, a driving mechanism, which exercises driving force for moving up and down the lifting and lowering frame 110, is constituted of the ball screw 220, the motor 230 and the nut member 240. It is to be noted that, as the driving mechanism, a pneumatic or hydraulic cylinder and any other mechanism can be adopted.

That is, the lifting and lowering frame 110 (i.e., the holding unit 100) is moved down through the nut member 240 when the ball screw 220 rotates in one direction by rotation driving force of the motor 230 and, on the other hand, the lifting and lowering frame 110 (i.e., the holding unit 100) is moved up through the nut member 240 when the ball screw 220 rotates in the other direction.

Since the driving mechanism (the ball screw 220, the motor 230 and a part of the nut member 240) is arranged in the rotation table 20 in this manner, when (the lifting and lowering frame 110 of) the holding unit 100 is guided so as to be capable of moving up and down along the guide rails 210, and obstacles to the lifting and lowering operations of the holding unit 100 (the lifting and lowering frame 110 and the holding frame 120) can be eliminated from the lifting and lowering region, whereby the holding unit 100 can be assuredly prevented from interfering with the driving mechanism to guarantee the smooth lifting and lowering operation.

As shown in FIG. 3 to FIG. 6, the fixing unit 300 includes the abutting member 310 movably supported so as to abut on and move away from the workpiece W, the urging members 320 that exercise urging force (tensile force in this example) in a direction along which the abutting member 310 is moved away from the workpiece W, the pressing member 330 that is supported to be movable in a pressing direction along which the abutting member 310 is pressed against the workpiece W and a releasing direction along which this pressing is released, the cam member 340 that is fixed on the sidewall 24 of the rotation table 20 and exercises the cam function of moving the pressing member 330 in the pressing direction in interlock with the lifting operation of the holding unit 100 and moving the pressing member 330 in the releasing direction in interlock with the lowering operation of the holding unit 100.

As shown in FIG. 6, the abutting member 310 is provided on the holding frame 120, and supported so as to be movable in a linear direction running through the center of the opening portion 122 so as to be capable of abutting and moving away from the workpiece W held by the holding portion 121.

As shown in FIG. 6, the urging members 320 are provided on the holding frame 120, and formed to apply an urging force (tensile force) in a direction along which the abutting member 310 is moved away from the workpiece W held by the holding portion 121.

As shown in FIG. 3, FIG. 4 and FIG. 6, the pressing member 330 is movably held by the holding portion 112*e* on the lower surface of the lifting and lowering frame 110, and has the pressing pin 331 that extends upward and pierces the slot 112 at one end side thereof, a follower pin 332 that extends in the horizontal direction and is inserted into a cam groove 343 of the cam member 340 (described later) at the other end side thereof.

As shown in FIG. 3 to FIG. 6, a lower end portion 341 of the cam member 340 passes through the opening portion 111*b* formed in (the slider portion 111 of) the lifting and lowering frame 110 to be fixed on the sidewall 24 of the rotation table 20, and an upper end portion 342 of the cam member is formed as a free end portion so as to pass through the opening portion 112*a* formed in (the holder portion 112 of) the lifting and lowering frame 110, whereby the cam member defines the cam groove 343 that extends obliquely upwards from a lower side.

The cam groove 343 receives the follower pin 332 of the pressing member 330, and is formed so as to exercise a cam function of moving the pressing member 330 in a pressing direction (a direction along which the abutting member 310 is pressed against the workpiece W) in interlock with the lifting operation of the holding unit 100 and moving the pressing member 330 in a releasing direction (a direction along which the pressing of the abutting member 310 against the workpiece W is released) in interlock with the lowering operation of the holding unit 100.

In the above-described configuration, the urging member 320, the pressing member 330 and the cam member 340 constitute the interlocking mechanism that presses the abutting member 310 against the workpiece W in interlock with the lifting operation of the holding unit 100 and releases the pressing of the abutting member 310 against the workpiece W in interlock with the lowering operation of the holding unit 100.

Since the cam member 340 exercises the cam function with respect to the pressing member 330 by the lifting and lowering operation of the holding unit 100 in this manner, the pressing member 330 can press the abutting member 310 to fix the workpiece W, and the pressing member 330 can cancel the pressing of the abutting member 310 to release the workpiece W. Therefore, the configuration can be simplified without adopting special detecting means, and timings for pressing and releasing the workpiece W can be highly accurately set at a predetermined timing. Further, since the abutting member 310 and the urging member 320 are supported by the holding frame 120, the abutting member 310 having an optimum shape associated with the workpiece W can be adopted when preparing the holding frame 120 in accordance with a type of the workpiece W.

Operations of the work transfer apparatus M having the above-described configuration will now be explained with reference to FIG. 9A and FIG. 9B.

Figure 9A:
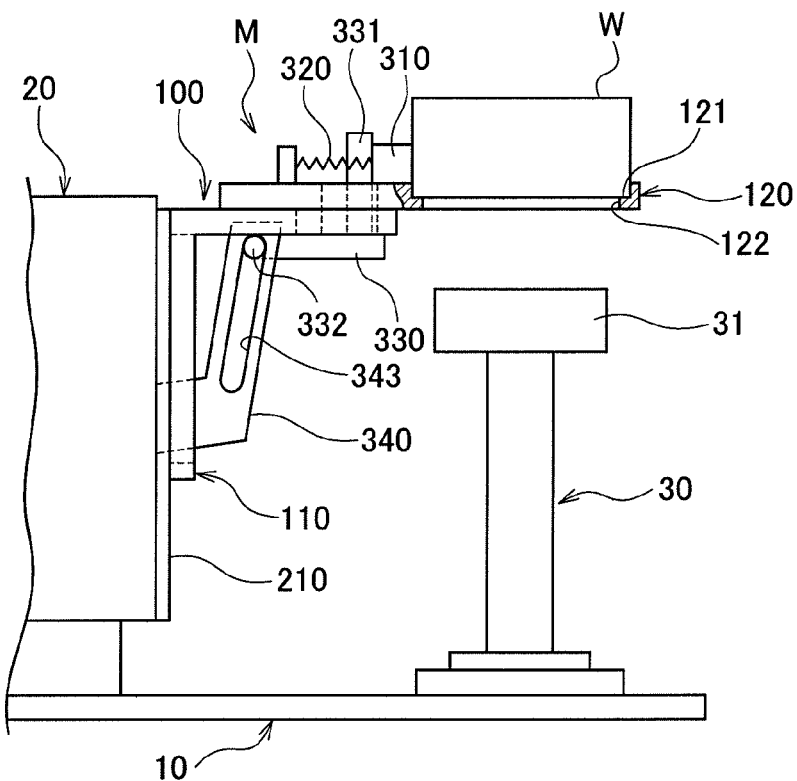
FIG. 9A is a side view showing a state where the holding unit in the work transfer apparatus holds a workpiece.

First, when the holding unit 100 is located at a predetermined raised height position, as shown in FIG. 9A, the workpiece W is held by the holding portion 121 of the holding unit 100 and pressed by the abutting member 310 of the fixing unit 300 to be fixed (held so as not to move) at a predetermined holding position.

Subsequently, when the holding unit 100 starts moving down by the lowering driving of the lifting and lowering unit 200, the fixation performed by (the abutting member 310 of) the fixing unit 300 is released in interlock with the lowering operation.

Figure 9B:
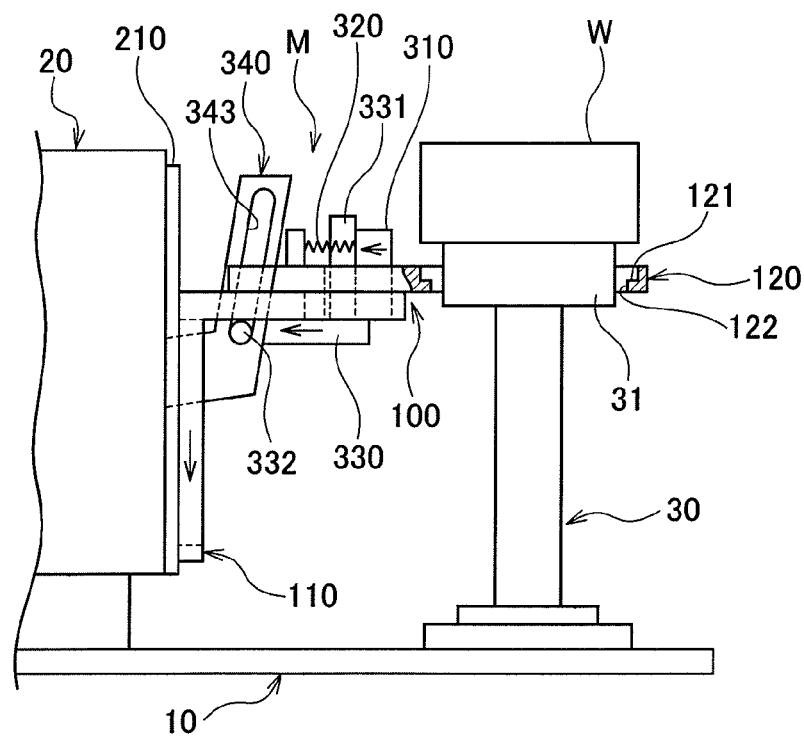
FIG. 9B is a side view showing a state where the holding unit in the work transfer apparatus has transferred the workpiece to a processing table.

Moreover, when the holding unit 100 further moves down to reach a predetermined height position, as shown in FIG. 9B, the workpiece W is held by the mount portion 31 of the processing table 30, and (the holding portion 121 of) the holding frame 100 moves away from the workpiece W and stops at a lower stop position. As a result, the workpiece W moves away from the holding unit 100 to be transferred onto the processing table 30.

Thereafter, predetermined processing is executed with respect to the workpiece W on the processing table 30.

On the other hand, when the predetermined processing is finished, the workpiece W is transferred onto the holding unit 100 from the processing table 30. That is, when the holding unit 100 starts moving up to reach a predetermined height position by the lifting driving of the lifting and lowering unit 200, (the holding portion 121 of) the holding unit 100 holds the workpiece W to be lifted up from (the mount portion 31 of) the processing table 30, and then (the abutting member 310 of) the fixing unit 300 presses and fixes the workpiece W held on the holding portion 121 in interlock with this lifting operation.

Additionally, as shown in FIG. 9A, the holding unit 100 further moves up and stops at the original height position.

The workpiece W can be transferred onto the processing table 30 from the holding unit 100 and the processed workpiece W can be lifted up from the processing table 30 to be transferred onto the holding unit 100 by the lifting and lowering operations of the holding unit 100 and the fixing and releasing operations of the fixing unit 300 alone, whereby simplification of the construction, miniaturization of the apparatus, reduction in time required for transferring the workpiece can be achieved.

Further, since the workpiece W can be subjected to predetermined processing on the processing table 30 provided separately from the rotation table 20, the rotation table 20 can be simplified as compared with an example where processing is performed on the rotation table 20.

Processing operations of the processing system adopting the work transfer apparatus M will now be described with reference to FIG. 1, FIG. 9A and FIG. 9B.

First, in a state that the holding unit 100 has moved down to a predetermined height position in the processing area A1, an operator sets the workpiece W on (the mount portion 31 of) the processing table 30 as shown in FIG. 9B.

Thereafter, when the holding unit 100 moves up to a predetermined height position, as shown in FIG. 9A, the workpiece W is lifted up from the processing table 30 and held by (the holding portion 121 of) the holding unit 100, and the fixing unit 300 performs the fixing operation in interlock with this lifting operation, thereby fixing the workpiece W at this holding position.

Then, when the rotation table 20 rotates by a predetermined angle (approximately 60 degrees), the workpiece W is carried to the next processing area A2.

Subsequently, in the processing area A2, when the holding unit 100 moves down to a predetermined height position, the fixing unit 300 carries out the fixation releasing operation in interlock with this lowering operation, whereby the workpiece W is transferred onto (the mount portion 31 of) the processing table 30 as shown in FIG. 9B.

Further, a predetermined processing unit (not shown) arranged in the processing area A2 performs predetermined processing with respect to the workpiece W.

When the processing is finished, the holding unit 100 moves up to a predetermined height position, as shown in FIG. 9A, the workpiece W is lifted up from the processing table 30 to be held by (the holding portion 121 of) the holding unit 100, and the fixing unit 300 performs the fixing operation in interlock with this lifting operation, thus fixing the workpiece W at this holding position.

Then, when the rotation table 20 rotates by a predetermined angle (approximately 60 degrees), the workpiece W is carried to the next processing area A3.

Furthermore, in the processing area A3 to the processing area A6, like the above description, transfer of the workpiece W from the holding unit 100 onto the processing table 30 by the lifting and lowering operations of the holding unit 100, predetermined processing with respect to the workpiece W transferred onto the processing table 30, transfer of the processed workpiece W from the processing table 30 onto the holding unit 100 and carriage of the workpiece W by rotation of the rotation table 20 are sequentially performed, and the workpieces W that have been through all types of processing are classified into an accepted product (an OK product) and a rejected product (an NG product) and carried out of a carrier line 40.

Here, to enable coping with different types of workpieces W as processing targets, the holding frames 120 and the mount portions 31 associated with types (sizes, shapes, etc.) of workpieces W are prepared in advance. When the workpiece W as a processing target is changed, the holding frame 120 and the mount portion 31 are replaced with those associated with the workpiece W.

According to the above-described processing system, since the rotation table 20 is provided with the plurality of (six) holding units 100 arranged in the circumferential direction and the lifting and lowering unit 200 and the fixing unit 300 corresponding to each of the holding units 100, a plurality of types of processing can be applied to the plurality of workpieces W at the same time by rotating the rotation table 20 in a predetermined angle steps, lifting and lowering the holding units 100 and performing the fixing operation and the releasing operation for the workpieces W by the fixing units 300 with the plurality of processing tables 30 being arranged around the rotation table 20.

Furthermore, since the workpiece W can be transferred onto the processing table 30 from the holding unit 100 and the processed workpiece W can be lifted up from the processing table 30 to be transferred onto the holding unit 100 by the lifting and lowering operations of the holding unit 100 and the fixing and releasing operations of the fixing unit 300 alone, simplification of the construction, miniaturization of the apparatus, reduction in time required for transferring the workpiece can be achieved, predetermined processing can be performed with respect to the workpiece W on the processing table 30 apart from the upper side of the rotation table 20, whereby the rotation table 20 can be simplified as compared with an example where the processing is performed on the rotation table 20.

In the foregoing embodiment, the configuration where the six work transfer apparatuses M are provided to the rotation table 20 and the six processing tables 30 (and the processing areas A1 to A6) are arranged in accordance with this quantity has been described, but the present invention is not limited thereto, the five or less or seven or more work transfer apparatuses M and processing tables 30 may be arranged.

Figure 10A:
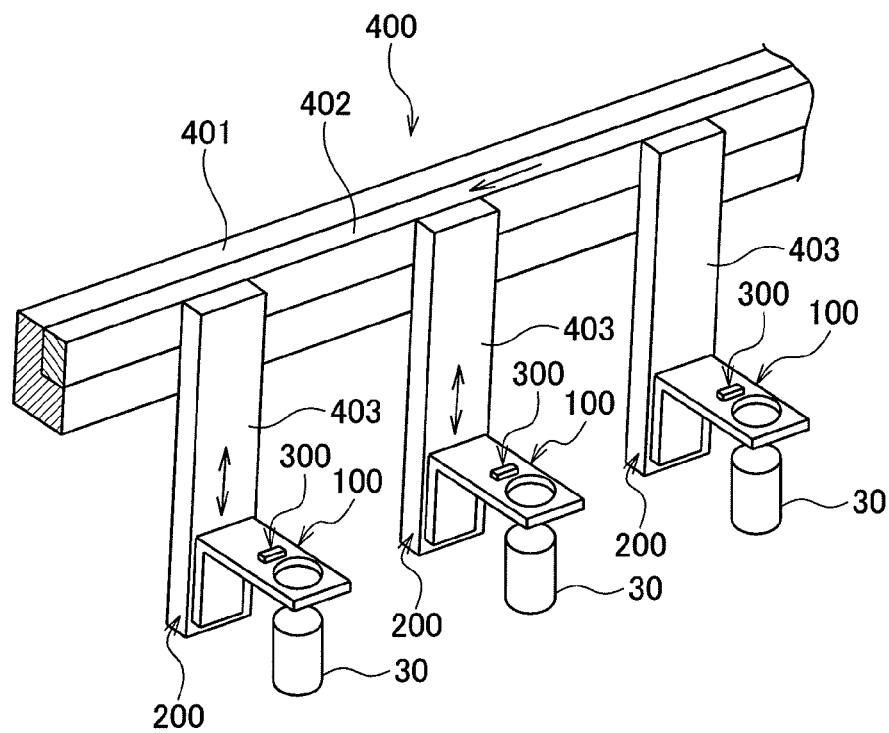
FIG. 10A is a schematic view showing another embodiment of the processing system including the work transfer apparatus according to the present invention.

FIG. 10A shows another embodiment of a processing system including a work transfer apparatus according to the present invention. In this embodiment, as shown in FIG. 10A, as a transferring mechanism, a conveyer unit 400 that is driven to be intermittently fed along a track hung from a ceiling is adopted.

As shown in FIG. 10A, the conveyer unit 400 includes a track 401 arranged in an upper region of a processing area, a movable conveyer 402 that moves along the track 401, hanging frames 403 connected to the movable conveyer 402 to be hung at predetermined intervals.

A holding unit 100 is attached to each of the hanging frames 403. Furthermore, a lifting and lowering unit 200 and a fixing unit 300 are provided in accordance with each holding unit 100.

The lifting and lowering unit 200 is provided to the hanging frame 403.

That is, the plurality of holding units 100 are arranged along one side portion of the conveyer unit 400, and a plurality of processing tables 30 are arranged along the one side portion of the conveyer unit 400.

Here, as the track 401, a curved track, an elliptic track, and the like can be adopted besides the linear track depicted in FIG. 10A.

In this embodiment, like the above description, since the workpiece W can be transferred onto the processing table 30 from the holding unit 100 and the processed workpiece W can be lifted up from the processing table 30 to be transferred onto the holding unit 200 by the lifting and lowering operations of the holding unit 100 and the fixing and releasing operations of the fixing unit 300 alone, simplification of the construction, miniaturization of the apparatus, reduction in time required for transferring the workpiece can be achieved, and the workpiece W can be subjected to predetermined processing on the processing table 30 provided separately from the conveyer unit 400, whereby the conveyer unit 400 can be simplified as compared with a configuration where processing is performed on the conveyer unit 400.

Figure 10B:
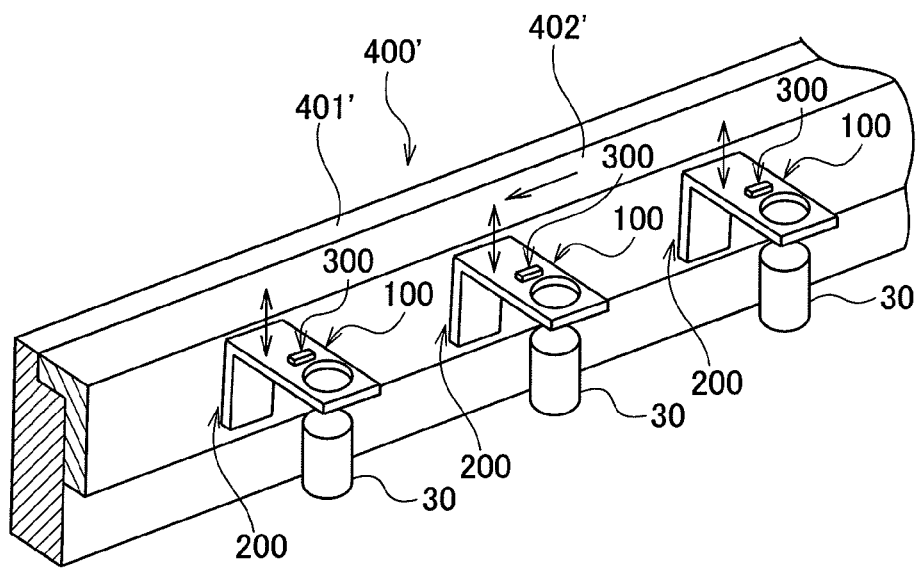
FIG. 10B is a schematic view showing still another embodiment of the processing system including the work transfer apparatus according to the present invention.

FIG. 10B shows still another embodiment of the processing system including the work transfer apparatus according to the present invention. In this embodiment, as shown in FIG. 10B, as a transferring mechanism, a conveyer unit 400' that is driven to be intermittently fed along a track installed on a floor is adopted.

As shown in FIG. 10B, the conveyer unit 400' includes a track 401' arranged on a floor of a processing area, a movable conveyer 402' that moves along the track 401'.

A plurality of holding units 100 are attached on a sidewall of the movable conveyer 402' at predetermined intervals. Further, a lifting and lowering unit 200 and a fixing unit 300 are provided to each of the holding units 100.

The lifting and lowering units 200 are provided on the sidewall of the movable conveyer 402'.

That is, the plurality of holding units 100 are arranged along one side portion of the conveyer unit 400', and a plurality of processing tables 30 are arranged along the one side portion of the conveyer unit 400'.

Here, as the track 401', a curved track, an elliptic track can be adopted besides such a linear track as depicted in FIG. 10B.

In this embodiment, like the above description, since a workpiece W can be transferred onto the processing table 30 from the holding unit 100 and the processed workpiece W can be lifted up from the processing table 30 to be transferred onto the holding unit 200 by the lifting and lowering operations of the holding unit 100 and the fixing and releasing operations of the fixing unit 300 alone, simplification of the construction, miniaturization of the apparatus, reduction in time required for transferring the workpiece can be achieved, and predetermined processing can be applied to the workpiece W on the processing table 30 provided separately from the conveyer unit 400', whereby the conveyer unit 400' can be simplified as compared with a configuration where processing is performed on the conveyer unit 400'.

In the foregoing embodiment, the holding unit 100 in which the holding frame 120 can be attached to or detached from the lifting and lowering frame 110 has been described as the holding unit that holds the workpiece W, but the present invention is not limited thereto, and the holding frame 120 may be integrally formed with respect to the lifting and lowering frame 110.

In the foregoing embodiment, although the unit which performs the fixing operation and the releasing operation with respect to the workpiece W in interlock with the lifting and lowering operations of the holding unit 100 has been described as the fixing unit, but the present invention is not limited thereto, and the fixing unit may be configured to interlock with operations other than those of the holding unit 100.

As described above, since the work transfer apparatus according to the present invention can deliver or receive the workpiece that is intermittently carried by the transferring mechanism to or from each of the processing tables arranged along the carrying direction while achieving simplification of the construction, miniaturization of the apparatus, realization of a low cost, and reduction in time required for transferring the workpiece, the work transfer apparatus can be of course applied in a mechanical field that handles relatively heavy articles as workpieces, and it is useful in an electronic device field handling relatively lightweight articles as workpieces and also useful in fields handling other workpieces.

The invention claimed is:

1. A work transfer apparatus capable of transferring a workpiece intermittently carried in a predetermined carrying direction by a transferring mechanism onto a processing table arranged along the carrying direction, the work transfer apparatus comprising:
    a holding unit that is attached to the transferring mechanism and configured to hold the workpiece;
    a lifting and lowering unit that lowers the holding unit to transfer the workpiece held by the holding unit onto the processing table and lifts the holding unit to transfer the workpiece from the processing table onto the holding unit; and
    a fixing unit configured to fix the workpiece held by the holding unit and release the fixation of the workpiece when transferring the workpiece onto the processing table,
    wherein the fixing unit includes an abutting member that is movably supported so as to be capable of abutting on and separating from the workpiece, and an interlocking mechanism that presses the abutting member against the workpiece in conjunction with upward movement of the holding unit and releases the pressing of the abutting member in conjunction with downward movement of the holding unit.

2. The work transfer apparatus according to claim 1, wherein the interlocking mechanism includes an urging member that urges the abutting member in a direction along which the abutting member is separated from the workpiece, a pressing member that is supported so as to be movable in a pressing direction along which the abutting member is pressed against the workpiece and a releasing direction along which the pressing is released, and a cam member that is fixed to the transferring mechanism and exercises a cam function of moving the pressing member in the pressing direction in conjunction with the upward movement of the holding unit and moving the pressing member in the releasing direction in conjunction with the downward movement of the holding unit.

3. The work transfer apparatus according to claim 1, wherein the transferring mechanism includes a rotation table that can be intermittently rotated,
    the processing table is arranged around the rotation table,
    the holding unit includes of a plurality of holding units arranged in a circumferential direction of the rotation table, and
    each of the holding units is provided with the lifting and lowering unit and the fixing unit are provided in accordance with each of the plurality of holding units.

4. The work transfer apparatus according to claim 1, wherein:
    the transferring mechanism includes a conveyer unit capable of being driven to be intermittently fed along a predetermined track;
    the processing table is arranged along one side of the conveyer unit;
    the holding unit includes a plurality of holding units arranged along the one side of the conveyer unit; and
    the lifting and lowering unit and the fixing unit are provided with each of the plurality of holding units.

5. The work transfer apparatus according to claim 1, wherein the holding unit includes a lifting and lowering frame that is supported so as to be capable of moving up and down with respect to the transferring mechanism, and a holding frame that is formed to have a holding portion configured to hold the workpiece and an open portion allowing the processing table to pass therethrough.

6. The work transfer apparatus according to claim 5, wherein the holding frame is detachably formed with respect to the lifting and lowering frame.

7. The work transfer apparatus according to claim 5, wherein the lifting and lowering unit includes:
- at least one guide rail fixed to the transferring mechanism, the at least one guide rail guiding the lifting and lowering frame to allow the lifting and lowering frame to move up and down; and
- a driving mechanism arranged in the transferring mechanism to provide driving force for lifting and lowering the lifting and lowering frame.

8. A work transfer assembly comprising:
- a transferring mechanism capable of transferring a workpiece in predetermined carrying directions, the transferring mechanism including a rotation table that can be intermittently rotated;
- a plurality of processing tables arranged along the carrying directions of the transferring mechanism, respectively; and
- a plurality of work transfer apparatuses circumferentially spaced around the rotation table of the transferring mechanism,
- each of the work transfer apparatuses comprises i) a workpiece holding unit attached to the transferring mechanism, ii) a lifting and lowering unit that lowers the holding unit to transfer the workpiece held by the holding unit onto the respective processing table and lifts the holding unit to transfer the workpiece from the respective processing table to the holding unit, and iii) a fixing unit configured to fix the workpiece held by the holding unit and release the fixation of the workpiece when transferring the workpiece onto the respective processing table.

9. A work transfer apparatus capable of transferring a workpiece intermittently carried in a predetermined carrying direction by a transferring mechanism onto a processing table arranged along the carrying direction, the work transfer apparatus comprising:
- a holding unit that is attached to the transferring mechanism and configured to hold the workpiece;
- a lifting and lowering unit that lowers the holding unit to transfer the workpiece held by the holding unit onto the processing table and lifts the holding unit to transfer the workpiece from the processing table onto the holding unit; and
- a fixing unit configured to fix the workpiece held by the holding unit and release the fixation of the workpiece when transferring the workpiece onto the processing table,
- wherein the lifting and lowering unit includes i) at least one guide rail that is fixed to the transferring mechanism, the at least one guide rail guides the lifting and lowering frame to allow the lifting and lowering frame to move up and down, and ii) a driving mechanism that is arranged in the transferring mechanism to provide driving force for lifting and lowering the lifting and lowering frame.

\* \* \* \* \*